United States Patent
Lutz et al.

(10) Patent No.: US 9,764,725 B2
(45) Date of Patent: Sep. 19, 2017

(54) DEVICE FOR OPERATING A BRAKE SYSTEM OF A MOTOR VEHICLE, AND ROTARY POSITION SENSOR

(71) Applicant: Robert Bosch GmbH, Stuttgart (DE)

(72) Inventors: Bernd Lutz, Kempten (DE); Andreas Weh, Sulzberg (DE); Matthias Mayr, Rettenberg (DE); Juergen Tandler, Fuessen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 28 days.

(21) Appl. No.: 14/885,618

(22) Filed: Oct. 16, 2015

(65) Prior Publication Data

US 2016/0107627 A1    Apr. 21, 2016

(30) Foreign Application Priority Data

Oct. 16, 2014  (DE) .................. 10 2014 221 015

(51) Int. Cl.
  *B60T 8/36*    (2006.01)
  *B60T 13/74*   (2006.01)
  (Continued)

(52) U.S. Cl.
  CPC .............. *B60T 13/74* (2013.01); *B60T 8/368* (2013.01); *B60T 13/745* (2013.01); *G01D 5/20* (2013.01); *H02K 11/21* (2016.01)

(58) Field of Classification Search
  CPC ........ B60T 8/368; B60T 13/74; B60T 13/745; H02K 11/0015; G01D 5/20
  (Continued)

(56) References Cited

U.S. PATENT DOCUMENTS 6,129,193 A * 10/2000 Link .................... B60H 1/3222
                                              192/84.1
6,354,674 B1 * 3/2002 Iwamoto ................. B60T 8/368
                                              303/119.3
(Continued)

FOREIGN PATENT DOCUMENTS

DE           42 38 965        5/1994

*Primary Examiner* — Thomas Irvin
(74) *Attorney, Agent, or Firm* — Norton Rose Fulbright US LLP; Gerard Messina

(57) ABSTRACT

A device is provided for operating a brake system of a motor vehicle having an electric motor, which is configured for driving a pressure generation unit in order to generate hydraulic pressure; a housing block of a hydraulic unit, which is able to be connected to the pressure generation unit and the brake system of the motor vehicle; a control unit for controlling the electric motor; and a rotary position sensor of the electric motor, the electric motor being fixed in place on a first side of the housing block of the hydraulic unit, and the control unit being fixed in place on a second side, situated opposite from the first side, of the housing block of the hydraulic unit, and the rotary position sensor of the electric motor being situated in such a way that it detects a rotational frequency and/or an angular position of a rotor of the electric motor and is connected to the control unit by an opening developed in the housing block of the hydraulic unit. Also provided is a method for operating a brake system of a motor vehicle, and to a rotary position sensor.

15 Claims, 3 Drawing Sheets

(51) Int. Cl.
*G01D 5/20* (2006.01)
*H02K 11/21* (2016.01)

(58) Field of Classification Search
USPC ..... 310/68 B; 303/20, 116.4, 119.3, DIG. 10
See application file for complete search history.

(56) References Cited

U.S. PATENT DOCUMENTS

| | | | |
|---|---|---|---|
| 6,634,723 B1* | 10/2003 | Parker | B60T 8/368 |
| | | | 303/119.3 |
| 7,589,443 B2* | 9/2009 | Kataoka | H02K 11/215 |
| | | | 310/68 B |
| 7,663,274 B2* | 2/2010 | Kataoka | H02K 3/522 |
| | | | 310/68 R |
| 7,703,862 B2* | 4/2010 | Abe | B60T 8/368 |
| | | | 303/119.3 |
| 7,720,589 B2* | 5/2010 | Hashiba | B60T 8/368 |
| | | | 180/271 |
| 7,795,766 B2* | 9/2010 | Kataoka | B62D 5/0403 |
| | | | 310/68 B |
| 7,959,238 B2* | 6/2011 | Qin | B60T 8/4022 |
| | | | 303/116.4 |
| 8,783,794 B2* | 7/2014 | Iyatani | B60T 8/368 |
| | | | 303/119.3 |
| 9,103,354 B2* | 8/2015 | Yahagi | F15B 15/00 |
| 2005/0265852 A1* | 12/2005 | Nakazawa | B60T 8/368 |
| | | | 417/63 |

* cited by examiner

DEVICE FOR OPERATING A BRAKE SYSTEM OF A MOTOR VEHICLE, AND ROTARY POSITION SENSOR

FIELD OF THE INVENTION

The present invention relates to a device for operating a brake system of a motor vehicle and to a rotary position sensor for an electric motor for use in a device for operating a brake system of a motor vehicle.

BACKGROUND INFORMATION

As a rule, units having electric motors for operating a brake system of a motor vehicle use an electric motor which has an rpm sensor and is actuated by a control unit of the module. The rpm sensor is electrically connected to the control unit. The electrical wiring and cabling from the rpm sensor to the control unit is normally routed around a housing block of a hydraulic unit of the module, the electric motor being situated on a first side of the housing block of the hydraulic unit, and the control unit on a second side of the housing block of the hydraulic unit.

German Published Patent Application No. 42 38 965 describes an electric motor equipped with an rpm sensor; via electric lines, the electric motor and the rpm sensor are connected to a control unit for a voltage supply of the electric motor and the rpm sensor, and for recording the sensor signal output by the rpm sensor via a signal line. The voltage connections of the rpm sensor are connected to a motor terminal of the electric motor, and the signal line is connected to a voltage terminal of the operating voltage source.

SUMMARY

The present invention provides a device for operating a brake system of a motor vehicle which has an electric motor configured for driving a pressure generation unit in order to generate hydraulic pressure; a housing block of a hydraulic unit, which is able to be connected to the pressure generation unit and the brake system of the motor vehicle; a control unit for controlling the electric motor; and a rotary position sensor of the electric motor. The electric motor is fixed in place at a first location of the housing block of the hydraulic unit, and the control unit is fixed in place on a second side, situated across from the first side, of the housing block of the hydraulic unit, and the rotary position sensor of the electric motor is situated in such a way that it detects a rotational frequency and/or an angular position of a rotor of the electric motor and is connected to the control unit by way of an opening developed in the housing block of the hydraulic unit.

The present invention furthermore provides a method for operating a brake system of a motor vehicle. The method includes supplying an electric motor, which drives a pressure generation unit for generating hydraulic pressure. In addition, the method includes supplying a housing block of a hydraulic unit, which is connected to the pressure generation unit and the brake system of the motor vehicle. Moreover, the method includes supplying a control unit for controlling the electric motor, and supplying a rotary position sensor of the electric motor, the electric motor being fixed in place on a first side of the housing block of the hydraulic unit, and the control unit being fixed in placed on a second side of the housing block of the hydraulic unit lying across from the first side. The rotary position sensor of the electric motor detects a rotational frequency and/or an angular position of a rotor of the electric motor and is connected to the control unit by way of an opening developed in the housing block of the hydraulic unit.

In addition, the present invention provides a rotary position sensor for an electric motor to be used in a device for operating a brake system of a motor vehicle, which is developed to detect a rotary frequency and/or an angular position of a rotor of the electric motor, and to be connected to a control unit by way of an opening developed in a housing block of a hydraulic unit.

One idea of the present invention is to provide a rotary position sensor, which taps off a signal directly at the rotor and transmits the signal via a direct, or the shortest possible link to the control unit. By inserting the rotary position sensor through the opening developed in the housing block of the hydraulic unit, it is no longer necessary to provide plug-in connections on the outside of the device for operating a brake system of a motor vehicle equipped with the electric motor, the housing block of the hydraulic unit, and the control unit for controlling the electric motor.

According to one preferred further development, the opening of the housing block of the hydraulic unit is realized by a through-hole, and the rotary position sensor of the electric motor is press-fit inside the through-hole with a predefined alignment. Because of the predefined alignment and the press-fitting of the rotary position sensor of the electric motor inside the through-hole, it is possible to align the rotary position sensor of the electric motor according to individual requirements and to retain it in the desired position.

According to one other preferred further development, the opening developed in the housing block of the hydraulic unit at least regionally includes a groove or shoulder, and the rotary position sensor of the electric motor at least regionally includes a protuberance, the rotary position sensor of the electric motor in the installed state being situated in such a way that the protuberance of the rotary position sensor of the electric motor engages with the groove or the shoulder of the opening in the housing block of the hydraulic unit for the form-fitting connection of the rotary position sensor of the electric motor with the opening of the housing block of the hydraulic unit. As a result, a stable and reliable connection or fit is able to be established between the rotary position sensor of the electric motor and the opening developed in the housing block of the hydraulic unit. Moreover, the rotary position sensor of the electric motor is retained in the desired correct alignment in a torsionally fixed manner.

According to another preferred further development, the rotary position sensor of the electric motor has an integrated circuit situated on a circuit board, which is disposed on or inside a plastic carrier, the integrated circuit being situated in a first end section of the plastic carrier, and electric contacts for contacting the control unit, which are connected to the circuit board by a pressed screen, being formed in a second end section of the plastic carrier. By placing all required components on or inside the plastic carrier, the rotary position sensor of the electric motor has a compact shape. This ensures a robust design and provides for a simple installation of the rotary position sensor of the electric motor.

According to another preferred further development, the opening of the housing block of the hydraulic unit is situated in parallel with an axis of rotation of the electric motor, and the protrusions of the rotary position sensor of the electric motors are developed in the form of a star. Placing the opening of the housing block of the hydraulic unit parallel to the axis of rotation of the electric motor makes it possible to provide a connection between the electric motor and the control unit that is preferably as short as possible. The star-shaped development of the protrusions of the rotary position sensor ensure a simple and secure fixation of the rotary position sensor inside the opening of the housing block of the hydraulic unit once the protrusions engage with the corresponding counterparts.

According to one additional preferred further development, a flange fixes the electric motor in place on the first side of the housing block of the hydraulic unit; an opening for the feed-through of the rotary position sensor of the electric motor, which is concentric with respect to the opening developed in the housing block of the hydraulic unit, is developed in the flange. The opening developed in the flange advantageously makes it possible to guide the rotary position sensor through the flange in order to allow it to tap off a signal at the adjacently located rotor.

According to another preferred further development, an annular magnet carrier disk is disposed on the rotor of the electric motor in a manner that prevents it from rotating The magnet carrier disk thus rotates along when the rotor of the electric motor is rotating and advantageously allows a detection of a rotational frequency and/or an angular position of the rotor of the electric motor with the aid of the rotary position sensor.

According to another preferred further development, the magnet carrier disk has a multitude of magnet elements which are situated next to each other and have an alternating N and S orientation, the rotary position sensor of the electric motor being developed to detect a change in the angles of the field lines of the individual magnet elements caused by a relative positional change between the rotary position sensor of the electric motor and the magnet elements. As a result, it is possible to detect the rotational frequency and/or the angular position of the rotor of the electric motor in a reliable manner.

According to another preferred further development, an annular toothed disk is disposed on the rotor of the electric motor in a manner that prevents rotation. Providing the toothed disk advantageously makes it possible to provide an inductive sensor for detecting the rotational frequency and/or the angular position of the rotor of the electric motor.

According to another preferred further development, the rotary position sensor of the electric motor is developed in the form of an inductive sensor, which detects a change in an amplitude of the oscillating circuit of the rotary position sensor of the electric motor brought about by a relative change in position between the rotary position sensor of the electric motor and particular toothed wheels. It is therefore possible to detect the rotational speed and/or the angular position of the rotor of the electric motor in a reliable manner.

According to another preferred further development, the rotary position sensor of the electric motor is configured for detecting the angular position of the rotor of the electric machine by an offset against a timing circuit signal at a predefined zero setting of the magnet carrier disk or the toothed disk. As a result, it is easy to detect the angular position of the rotor of the electric motor using the same means as the means for detecting the rotational frequency of the rotor of the electric motor.

According to another preferred further development, the rotary position sensor of the electric motor is configured for detecting a rotary position of the rotor of the electric motor in relation to a magnetic field of a stator of the electric motor. The rotary position sensor may thus be used to advantage for different types of electric motors.

According to another preferred further development, the rotary position sensor of the electric motor is configured for detecting the angular position of the rotor of the electric machine by an offset against a timing circuit signal at a predefined zero setting of the magnet carrier disk or the toothed disk. As a consequence, it is easy to detect the angular position of the rotor of the electric motor using the same means as the means for detecting the rotational frequency of the rotor of the electric motor.

The described embodiments and further refinements may be combined with each other as desired.

Additional possible embodiments, further refinements and implementations of the present invention also include combinations of features of the present invention that are not explicitly mentioned above or below with regard to the exemplary embodiments.

DETAILED DESCRIPTION

Figure 1:
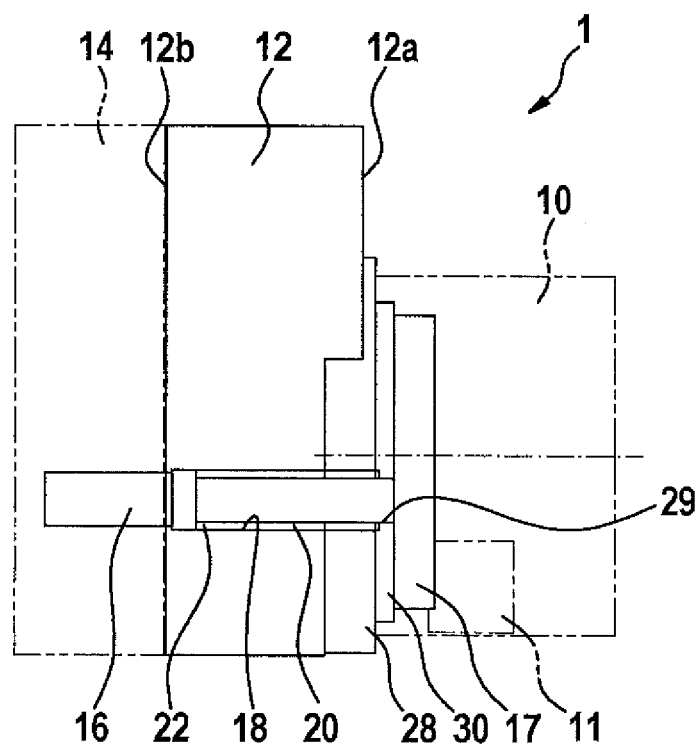
FIG. 1 a sectional view of a device for operating a brake system of a motor vehicle according to one preferred specific embodiment of the present invention.

Unless indicated otherwise, identical reference symbols in the figures of the drawing indicate identical or functionally equivalent elements, parts or components.

FIG. 1 shows a sectional view of a device for operating a brake system of a motor vehicle according to one preferred specific embodiment of the present invention.

Device 1 for operating the brake system of the motor vehicle has an electric motor 10, a pressure generation unit 11, a housing block 12 of a hydraulic unit, a control unit 14, and a rotary position sensor 16 of electric motor 10.

Electric motor 10 is preferably fixed in place on a first side 12a of housing block 12 of the hydraulic unit. According to the preferred specific embodiment of the present invention, electric motor 10 is developed in the form of an electronically commutated direct-current motor. As an alternative, the electric motor may also have some other suitable design. Electric motor 10 advantageously drives pressure generation unit 11 for generating hydraulic pressure. Pressure generation unit 11 in turn is connected to housing block 12 of the hydraulic unit and generates hydraulic pressure there when required. Electric motor 10 is advantageously fixed in place on first side 12a of housing block 12 of the hydraulic unit with the aid of a flange 28. According to the preferred specific embodiment of the present invention, an annular magnet carrier disk 30 is disposed on a rotor 17 of electric motor 10 in a torsionally fixed manner. Instead of the magnet carrier disk, a toothed disk may alternatively be fixed in place on the rotor in a torsionally fixed manner. The toothed disk is used for a rotary position sensor that operates according to the induction principle, whereas a rotary position sensor that operates according to the Hall effect principle is used if the magnet carrier disk is provided.

Fixed in place on a second side 12b of housing block 12 of the hydraulic unit is control unit 14 for controlling electric motor 10. Housing block 12 of the hydraulic unit furthermore has an uninterrupted opening 18 which is developed in the longitudinal direction of housing block 12 of the hydraulic unit. Rotary position sensor 16 of the electric motor is placed in such a way that it detects a rotational frequency and/or an angular position of rotor 17 of electric motor 10 and is connected to control unit 14 by way of opening 18 developed in housing block 12 of the hydraulic unit.

Opening 18 of housing block 12 of the hydraulic unit preferably takes the form of a through-hole. As an alternative, opening 18 of housing block 12 of the hydraulic unit may also be introduced by some other suitable machining method. Rotary position sensor 16 of electric motor 10 is preferably press-fit inside the through-hole at a predefined alignment.

Opening 18 formed in housing block 12 of the hydraulic unit preferably has a shoulder 20 at least regionally, and rotary position sensor 16 has a protrusion 22 at least regionally. As an alternative, opening 18 created in housing block 12 of the hydraulic block at least regionally may also have a groove, and rotary position sensor 16 of electric motor 10 at least regionally have protrusion 22.

In the installed state, rotary position sensor 16 of electric motor 10 is preferably situated in such a way that protrusion 22 of rotary position sensor 16 of electric motor 10 engages with shoulder 20 of opening 18 in housing block 12 of the hydraulic unit for the form-fitting connection of rotary position sensor 16 of electric motor 10 and opening 18 of housing block 12 of the hydraulic unit. As an alternative, rotary position sensor 16 of electric motor 10 in the installed state may be situated in such a way that protrusion 22 of rotary position sensor 16 of electric motor 10 engages with the groove of the opening in housing block 12 of the hydraulic unit for the form-fitting connection of rotary position sensor 16 of electric motor 10 and opening 18 of housing block 12 of the hydraulic unit.

Shoulder 20 of opening 18 in housing block 12 of the hydraulic unit preferably is positioned on the side of the control unit, since rotary position sensor 16 is introduced into the opening of housing block 12 from the side of the control unit. Once rotary position sensor 16 has been placed in the opening of housing block 12, rotary position sensor 16 is axially fixated, preferably by introducing a stamp for folding material of housing block 12.

Electric motor 10 is preferably installed on first side 12a of housing block 12 of the hydraulic unit with the aid of flange 28, in which an opening 29, which is concentric with respect to opening 18 formed in housing block 12 of the hydraulic unit, is developed for the feed-through of rotary position sensor 16 of electric motor 10.

Figure 2:
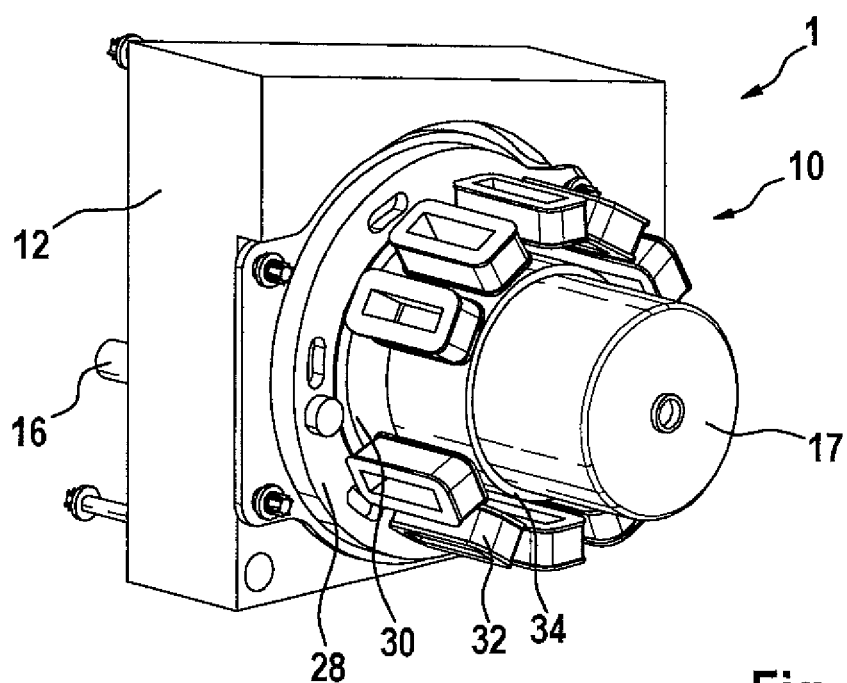
FIG. 2 a schematic view of the device for operating the brake system of the motor vehicle according to the preferred specific embodiment of the present invention.

FIG. 2 shows a schematic view of the device for operating the brake system of a motor vehicle according to the preferred specific embodiment of the present invention.

The opening of housing block 12 of the hydraulic unit is advantageously situated in parallel with an axis of rotation of electric motor 10. As illustrated in FIG. 2, rotary position sensor 16 is placed to the left of the electric motor according to the preferred specific embodiment, in such a way that it is situated next to magnet carrier disk 30 developed in the form of a ring on rotor 17, and thus is able to tap off a signal from magnet carrier disk 30.

A stator 32 having corresponding windings is provided around rotor 17. In addition, a packet 34 of ferromagnetic material is disposed on rotor 17, and a multiplicity of adjacently placed magnets is located above.

According to the preferred specific embodiment, the rotor is developed in an offset fashion for an interference fit on the A-bearing.

Figure 3:
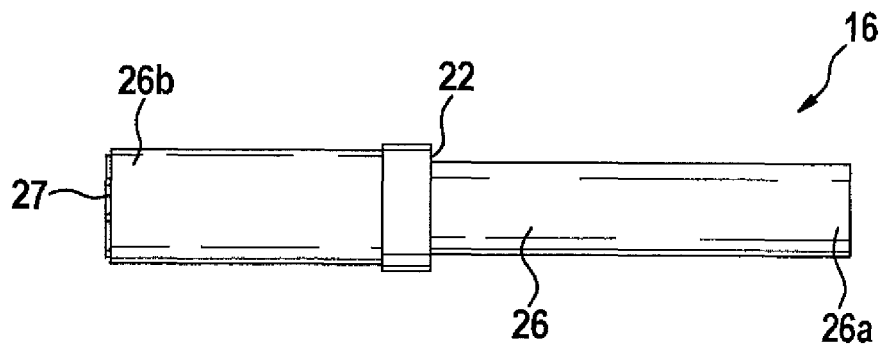
FIG. 3 a schematic representation of a rotary position sensor according to the preferred specific embodiment of the present invention.

FIG. 3 shows a schematic representation of a rotary position sensor in accordance with the preferred embodiment of the present invention.

Rotary position sensor 16 has a plastic carrier 26, on or inside which a circuit board (not shown in FIG. 3) fitted with an integrated circuit is situated. Plastic carrier 26 has a first end section 26a and a second end section 26b. In the assembled state, plastic carrier 26 is disposed in such a way that it is situated adjacently to first end section 26a, next to the rotor (not shown in FIG. 3) of the electric motor. A plurality of electric contacts 27 are formed at second end section 26b of plastic carrier 26. Electrical contacts 27 are used for contacting the control unit (not shown in FIG. 3). Situated in a central region of plastic carrier 26 is protrusion 22 for fixing plastic carrier 26 in position in the housing block of the hydraulic unit, which is not shown in FIG. 3, during the assembly.

Figure 4:
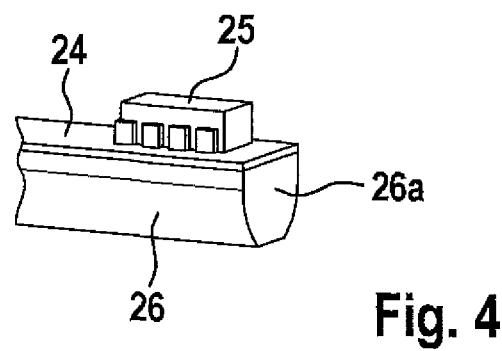
FIG. 4 an enlarged detail view of the rotary position sensor according to the preferred specific embodiment of the present invention.

FIG. 4 shows an enlarged detail view of the rotary position sensor in accordance with the preferred embodiment of the present invention.

On first end section 26a, plastic carrier 26 of rotary position sensor 16 advantageous includes circuit board 24, on which integrated circuit 25 or the sensor chip of rotary position sensor 16 is situated. In addition, circuit board 24 is connected to a pressed screen (not shown in FIG. 4). The pressed screen is advantageously connected to circuit board 24 using a press-fit bushing. As an alternative, some other suitable connection may be provided between circuit board 24 and the pressed screen. The pressed screen is guided on or inside plastic carrier 26 from first end section 26a to second end section 26b of plastic carrier 26 and connects circuit board 24 to electrical contacts 27 for contacting the control unit.

Figure 5:
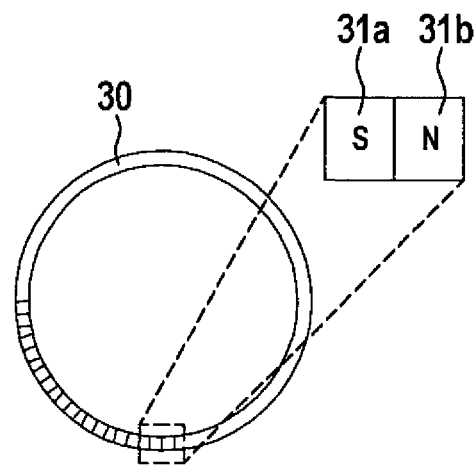
FIG. 5 a schematic representation of an annular magnet disk carrier according to the preferred specific embodiment of the present invention.

FIG. 5 shows a schematic representation of an annular magnet carrier disk in accordance with the preferred embodiment of the present invention.

Magnet carrier disk 30 has a multitude of adjacently located magnet elements 31a, 31b having an alternating N and S orientation. The rotary position sensor (not shown in FIG. 5) of the electric motor detects a change in the angle of the field lines of the individual magnet elements that was brought about by a relative positional change between the rotary position sensor of the electric motor and magnet elements 31a, 31b.

As an alternative to providing the magnet carrier disk, it is also possible to place a toothed disk on the rotor of the electric motor in a torsionally fixed manner. If a toothed disk is provided, the rotary position sensor of electric motor 10 operates according to the induction principle. In so doing, the rotary position sensor detects a change in an amplitude of an oscillating circuit of the rotary position sensor induced by a relative positional change between the rotary position sensor and the individual toothed wheels.

The rotary position sensor of the electric motor is furthermore configured for detecting the angular position of the rotor of the electric machine by an offset operation against a timing circuit signal at a predefined zero setting of magnet carrier disk 20 or, alternatively, the toothed disk. The rotary position sensor of the electric motor is configured to detect a rotary position of the rotor of the electric motor in relation to a magnetic field of a stator of the electric motor.

Figure 6:
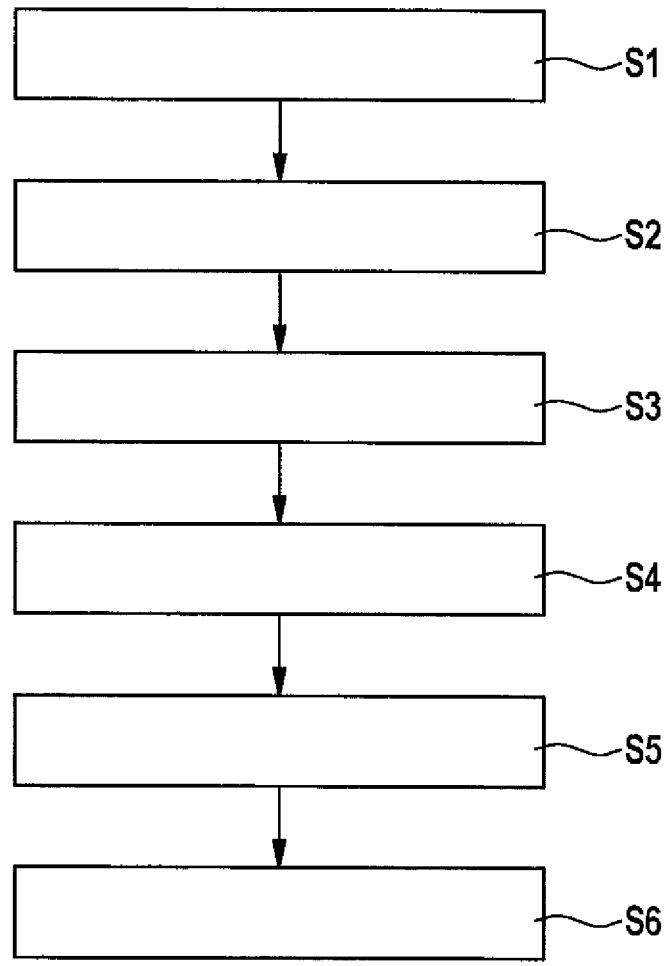
FIG. 6 a flow chart of a method for operating a brake system of a motor vehicle according to the preferred specific embodiment of the present invention.

FIG. 6 shows a flow chart of a method for operating a brake system of a motor vehicle according to the preferred specific embodiment of the present invention.

The method includes supplying S1 an electric motor 10, which drives a pressure generation unit 11 for generating hydraulic pressure. In addition, the method includes supplying S2 a housing block 12 of a hydraulic unit, which is connected to pressure generation unit 11 and the brake system of the motor vehicle. Moreover, the method includes supplying S3 a control unit 14 for controlling electric motor 10, and supplying S4 a rotary position sensor 16 of electric motor 10, electric motor 10 being fixed in place on a first side 12*a* of housing block 12 of the hydraulic unit, and control unit 14 being fixed in place on a second side 12*b*, lying across from first side 12*a*, of housing block 12 of the hydraulic unit; and rotary position sensor 16 of electric motor 10 detecting S5 a rotational frequency and/or an angular position of a rotor 17 of electric motor 10 and being connected to control unit 14 by way of an opening 18 developed in housing block 12 of the hydraulic unit.

Although the present invention was described above with reference to preferred exemplary embodiments, it is not limited to these and may be modified in numerous ways. In particular, the invention can be changed or modified in many ways without deviating from the core of the present invention.

For example, the rotary position sensor may also be produced from some other suitable material. Shoulder 20 developed in the through-hole of the housing block of the hydraulic unit or, alternatively, the groove may be implemented by a stepped bore.

What is claimed is:

1. A device for operating a brake system of a motor vehicle, comprising:
   an electric motor for driving a pressure generation unit for generating hydraulic pressure;
   a housing block of a hydraulic unit, which is able to be connected to the pressure generation unit and the brake system of the motor vehicle;
   a control unit for controlling the electric motor; and
   a rotary position sensor of the electric motor, wherein:
     the electric motor is fixed in place on a first side of the housing block of the hydraulic unit,
     the control unit is fixed in place on a second side of the housing block, the second side lying opposite from the first side,
     the rotary position sensor is situated in such a way that the rotary sensor detects at least one of a rotational frequency and an angular position of a rotor of the electric motor, and
     the rotary sensor is connected to the control unit through an opening developed in the housing block, a body of the rotary sensor extending through the opening from the first side of the housing block.

2. The device as recited in claim 1, wherein the opening of the housing block is a through-hole, the rotary position sensor being press-fit inside the through-hole at a predefined alignment.

3. The device as recited in claim 1, wherein the opening of the housing block at least regionally has one of a groove and a shoulder, and wherein the rotary position sensor at least regionally has a protrusion, the rotary position sensor in an installed state being situated in such a way that the protrusion of the rotary position sensor of the electric motor engages with the one of the groove and the shoulder for the form-fitting connection of the rotary position sensor with the opening of the housing block.

4. The device as recited in claim 1, wherein the rotary position sensor includes an integrated circuit situated on a circuit board that is situated one of on and inside a plastic carrier, the integrated circuit being situated on a first end section of the plastic carrier, and electrical contacts for contacting the control unit are connected to the circuit board by a pressed screen and are developed on a second end section of the plastic carrier.

5. The device as recited in claim 1, wherein the electric motor is fixed in place on the first side with the aid of a flange, wherein an opening developed concentrically with the opening in the housing block is formed in the flange for a feed-through of the rotary position sensor.

6. The device as recited in claim 1, further comprising an annular magnet carrier disk situated in a torsionally fixed manner on the rotor.

7. The device as recited in claim 6, wherein the magnet carrier disk has a multitude of adjacently situated magnet elements having an alternating N and S orientation, the rotary position sensor detecting a change in angles of field lines of the magnet elements caused by a relative change in position between the rotary position sensor and individual ones of the magnet elements.

8. The device as recited in claim 1, further comprising an annular toothed wheel disposed in a torsionally fixed manner on the rotor.

9. The device as recited in claim 8, wherein the rotary position sensor includes an inductive sensor that detects a change in an amplitude of an oscillating circuit of the rotary position sensor of the electric motor brought about by a relative change in position between the rotary position sensor and individual toothed wheels.

10. The device as recited in claim 1, wherein the rotary position sensor detects an angular position of the rotor by offsetting against a timing circuit signal at a predefined zero setting of one of a magnet carrier disk and a toothed disk.

11. The device as recited claim 1, wherein the rotary position sensor detects a rotary position of the rotor in relation to a magnetic field of a stator of the electric motor.

12. The device as recited in claim 1, wherein a first end of the rotary sensor emerges from the second side of the housing block and extends into an opening of the control unit.

13. The device as recited in claim 1, wherein an axial length of the body of the sensor is longer than a distance between the first and second sides of the block as measured along an axis perpendicular to the first and second sides.

14. The device as recited in claim 1, wherein the control unit is mounted to an exterior surface of the housing block.

15. A method for operating a brake system of a vehicle, comprising:
   supplying an electric motor that drives a pressure generation unit for generating hydraulic pressure;
   supplying a housing block of a hydraulic unit, which is connected to a pressure generation unit and a brake system of the motor vehicle;
   supplying a control unit for controlling the electric motor; and
   supplying a rotary position sensor of the electric motor, wherein:
     the electric motor is fixed in place on a first side of the housing block of the hydraulic unit, the control unit is fixed in place on a second side of the housing block, the second side lying opposite from the first side, the rotary position sensor is situated in such a way that the rotary sensor detects at least one of a rotational frequency and an angular position of a rotor of the electric motor, and the rotary sensor is connected to the control unit through an opening developed in the housing block, a body of the rotary sensor extending through the opening from the first side of the housing block.

* * * * *